United States Patent
Ishizaka et al.

(10) Patent No.: US 9,624,956 B2
(45) Date of Patent: Apr. 18, 2017

(54) WATERPROOF CLIP

(71) Applicants: HONDA MOTOR CO., LTD., Minato-Ku, Tokyo (JP); NIFCO INC., Yokohama-Shi, Kanagawa (JP)

(72) Inventors: Keita Ishizaka, Wako (JP); Mamoru Ishii, Wako (JP); Yohei Nagahori, Yokohama (JP)

(73) Assignees: Honda Motor Co., Ltd., Tokyo (JP); Nifco Inc., Kanagawa (JP)

( * ) Notice: Subject to any disclaimer, the term of this patent is extended or adjusted under 35 U.S.C. 154(b) by 179 days.

(21) Appl. No.: 14/508,010

(22) Filed: Oct. 7, 2014

(65) Prior Publication Data

US 2015/0104272 A1    Apr. 16, 2015

(30) Foreign Application Priority Data

Oct. 10, 2013  (JP) .................... 2013-212728

(51) Int. Cl.
  *F16B 19/00* (2006.01)
(52) U.S. Cl.
  CPC .......... *F16B 19/008* (2013.01); *F16B 19/004* (2013.01)
(58) Field of Classification Search
  CPC ..... F16B 19/004; F16B 19/008; F16B 21/086
  (Continued)

(56) References Cited

U.S. PATENT DOCUMENTS 2,780,128 A * 2/1957 Rapata ............... F16B 15/06
                                                411/510

3,272,059 A * 9/1966 Lyday ................ F16B 5/12
                                                411/510
(Continued)

FOREIGN PATENT DOCUMENTS

CN      101187424       5/2008
JP      S49-42362 U     4/1974
(Continued)

OTHER PUBLICATIONS

Official Communications dated Aug. 26, 2015 corresponding to Japanese Patent Application No. 2013-212728.
(Continued)

*Primary Examiner* — Gary Estremsky
(74) *Attorney, Agent, or Firm* — Carrier Blackman & Associates, P.C.; Joseph P. Carrier; Anne G. Sabourin

(57) ABSTRACT

Bulging portions elastically coming into contact with an inner peripheral surface of a fixation hole of a panel member are formed on an outer peripheral surface of a shaft portion of a waterproof clip made of an elastic material, thereby sealing a space between these surfaces by elasticity of the bulging portions to obtain a waterproof function, and firmly fixing the shaft portion to the panel member by friction force between the inner peripheral surface and the bulging portions. The clip requires no special seal member, thereby reducing the number of parts and assembly steps. Each bulging portion is formed narrower toward the front side in the insertion direction of the shaft portion, thereby easily press fitting the shaft portion into the fixation hole while improving waterproofness and airtightness by sufficiently compressing the bulging portions. The clip can surely fix an interior material to the panel member with excellent sealability.

4 Claims, 4 Drawing Sheets

(58) Field of Classification Search
USPC .................. 411/510; 277/607, 615; 24/297
See application file for complete search history.

(56) References Cited

U.S. PATENT DOCUMENTS

| | | | | |
|---|---|---|---|---|
| 3,466,966 | A * | 9/1969 | Brown | F16B 21/084 411/510 |
| 3,483,787 | A * | 12/1969 | Saunders | F16B 19/004 411/510 |
| 3,494,244 | A * | 2/1970 | Wayland | A47B 17/00 24/453 |
| 3,499,358 | A * | 3/1970 | Frye | E04B 1/5806 411/337 |
| 4,772,152 | A * | 9/1988 | Gill | B05B 15/00 220/277 |
| 5,308,205 | A * | 5/1994 | Lautenschlager | F16B 13/02 411/182 |
| 5,542,225 | A * | 8/1996 | Endo | E04F 13/045 52/511 |
| 5,850,640 | A * | 12/1998 | Pinciaro | F16L 5/10 285/139.2 |
| 7,797,892 | B2 * | 9/2010 | Cannistraro | F16L 5/04 138/89 |
| 8,162,166 | B2 | 4/2012 | Nakazato | |
| 2003/0017022 | A1 | 1/2003 | Meyer | |
| 2004/0109737 | A1 * | 6/2004 | Kato | F16B 19/1081 411/55 |
| 2007/0134073 | A1 * | 6/2007 | Shereyk | F16B 21/084 411/510 |
| 2012/0192386 | A1 | 8/2012 | Asai | |

FOREIGN PATENT DOCUMENTS

| | | |
|---|---|---|
| JP | S58-200807 A | 11/1983 |
| JP | H1-98909 U | 7/1989 |
| JP | H6-69413 U | 9/1994 |
| JP | 2002070821 A | 3/2002 |
| JP | 2010-121773 A | 6/2010 |
| JP | 2012-159143 A | 8/2012 |

OTHER PUBLICATIONS

Official communication dated Dec. 10, 2015 corresponding to Japanese application No. 2013-212728.

Official Communication dated Feb. 14, 2016 in corresponding Chinese Patent Application No. 201410483062.2.

* cited by examiner

WATERPROOF CLIP

BACKGROUND OF THE INVENTION

Field of the Invention

The present invention relates to a waterproof clip made of an elastic material for fixing an interior material to a panel member.

Description of the Related Art

The following clip for wire harness is publicly known from Japanese Patent Application Laid-open No. 2010-121773. The clip for wire harness includes: a shaft portion to be inserted into an attachment hole of a vehicle body panel; blade portions provided at a front end of the shaft portion to engage with an edge portion of the attachment hole; and an elastic water seal member made of urethane and supported on an outer periphery of the shaft portion. The clip seals the attachment hole to prevent water from entering a vehicle compartment through the attachment hole by engaging the water seal member with an inner peripheral surface of the attachment hole.

Moreover, the following waterproof clip is publicly known from Japanese Patent Application Laid-open No. 58-200807. In the waterproof clip, a flat-plate-shaped seal portion is formed adjacent to a head portion which penetrates an attachment hole of a panel and be locked thereto. The seal portion is brought into tight contact with a peripheral edge portion of the attachment hole to prevent water from entering the vehicle compartment through the attachment hole.

Furthermore, the following waterproof clip is publicly known from Japanese Patent Application Laid-open No. 2012-159143. In the waterproof clip, a clip main body formed of an anchor and a plate portion is molded from a resin with relatively high stiffness, and a sealing body which comes into contact with a surface of a panel member to have a waterproof function is molded from a resin with high water seal property.

SUMMARY OF THE INVENTION

The conventional techniques described above all require special sealing means for sealing the attachment hole, and thus have a problem of cost increase due to an increase in the number of parts and the increased complexity of the structure. Moreover, since the clip is fixed to the panel by engaging a locking member penetrating the attachment hole with a peripheral edge of the attachment hole, attachment of the clip may be impossible when thickness of the panel is larger than a set value, or the clip may be attached loosely when the thickness of the panel is smaller than the set value.

The present invention has been made in view of the circumstances described above, and an object thereof is to provide a waterproof clip which can surely fix an interior material to a panel member in a simple structure and which has excellent sealing characteristics.

In order to achieve the object, according to a first aspect of the present invention, there is provided a waterproof clip made of an elastic material for fixing an interior material to a panel member, comprising: a shaft portion that penetrates a through-hole of the interior material and is press-fitted to a fixation hole of the panel member; and a plate portion provided at a rear end of the shaft portion in an insertion direction thereof to come into contact with a surface of the interior material, wherein a number of bulging portions which elastically come into contact with an inner peripheral surface of the fixation hole are formed on an outer peripheral surface of the shaft portion, and each of the bulging portions is formed to become narrower toward a front side in the insertion direction of the shaft portion.

According to the first aspect of the present invention, the waterproof clip made of the elastic material includes: the shaft portion that penetrates the through-hole of the interior material and is press-fitted to the fixation hole of the panel member; and the plate portion provided at the rear end of the shaft portion in the insertion direction thereof to come into contact with the surface of the interior material. Accordingly, the interior material can be interposed and fixed between the plate portion and the panel member. Since a number of the bulging portions which elastically come into contact with the inner peripheral surface of the fixation hole are formed on the outer peripheral surface of the shaft portion, it is possible not only to seal a space between the outer peripheral surface of the shaft portion and the inner peripheral surface of the fixation hole of the panel member by using elasticity of the bulging portion so as to obtain a waterproof function, but also to firmly fix the shaft portion to the panel member by using friction force generated between the inner peripheral surface of the fixation hole and the bulging portions. In addition, since the waterproof clip requires no special seal member, the number of parts and the number of assembly steps can be reduced. Moreover, since each of the bulging portions is formed to become narrower toward the front side in the insertion direction of the shaft portion, it is possible to easily press fit the shaft portion into the fixation hole while improving waterproofness and air tightness at the same time by sufficiently compressing the bulging portions. Moreover, since no claw-shaped anchors or blade-shaped anchors which are fragile are used, durability of the bulging portions is high, and holding force does not decrease even when attachment and detachment is performed repeatedly. Furthermore, since the bulging portions are fixed to the inner peripheral surface of the fixation hole of the panel member, the waterproof clip can be used even when thickness of the panel member is too large for the shaft portion to penetrate the fixation hole.

According to a second aspect of the present invention, in addition to the first aspect, a hollow portion is formed in an inner portion of the shaft portion.

According to the second aspect of the present invention, since the hollow portion is formed in the inner portion of the shaft portion, the shaft portion easily elastically deforms and fitting of the waterproof clip is facilitated. In addition, flexibility of the shaft portion is increased and sealing performance by the bulging portions is improved.

According to a third aspect of the present invention, in addition to the second aspect, the hollow portion has a sectional area which becomes smaller toward the front side in the insertion direction of the shaft portion.

According to the third aspect of the present invention, since the hollow portion has a sectional area which becomes smaller toward the front side in the insertion direction of the shaft portion, a front end of the shaft portion in the insertion direction thereof is less likely to be bent, and insertion into the fixation hole of the panel member is facilitated.

According to a fourth aspect of the present invention, in addition to the first aspect, the plate portion includes an annular protruding portion in a connection portion with the shaft portion.

According to the fourth aspect of the present invention, since the plate portion includes the annular protruding portion in the connection portion with the shaft portion, the plate portion is less likely to be bent rearward in the insertion direction of the shaft portion.

According to a fifth aspect of the present invention, in addition to the first aspect, the bulging portions are formed at equal intervals in an axial direction.

According to the fifth aspect of the present invention, since the bulging portions are formed at equal intervals in the axial direction, it is possible to surely bring any of the bulging portions into contact with the inner peripheral surface of the fixation hole of the panel member.

The above and other objects, characteristics and advantages of the present invention will be clear from detailed descriptions of the preferred embodiments which will be provided below while referring to the attached drawings.

DESCRIPTION OF THE PREFERRED EMBODIMENTS

First Embodiment

A first embodiment of the present invention is described below based on FIGS. 1 to 3.

Figure 1:
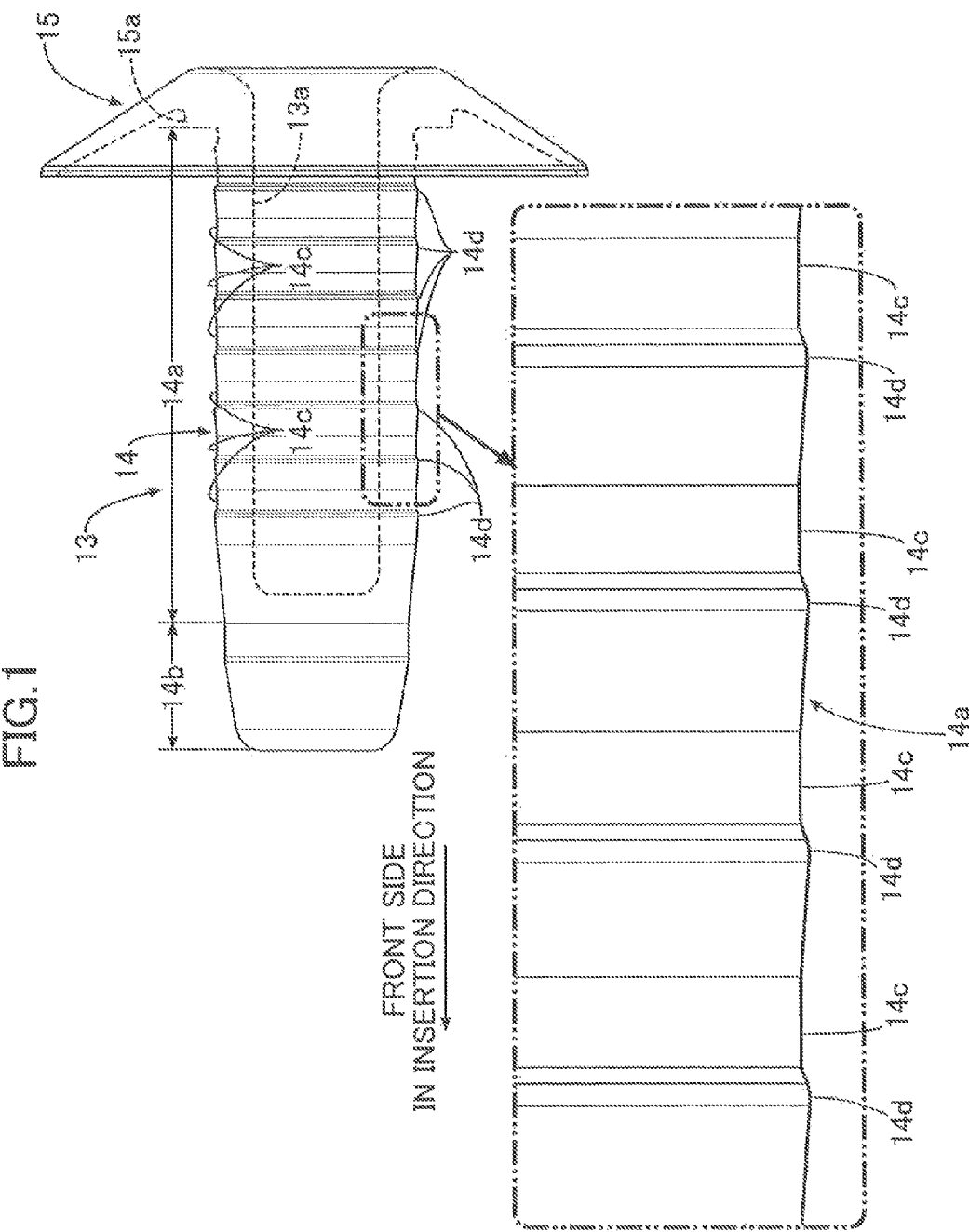
FIG. 1 is a side view of a waterproof clip (first embodiment).
Figure 2:
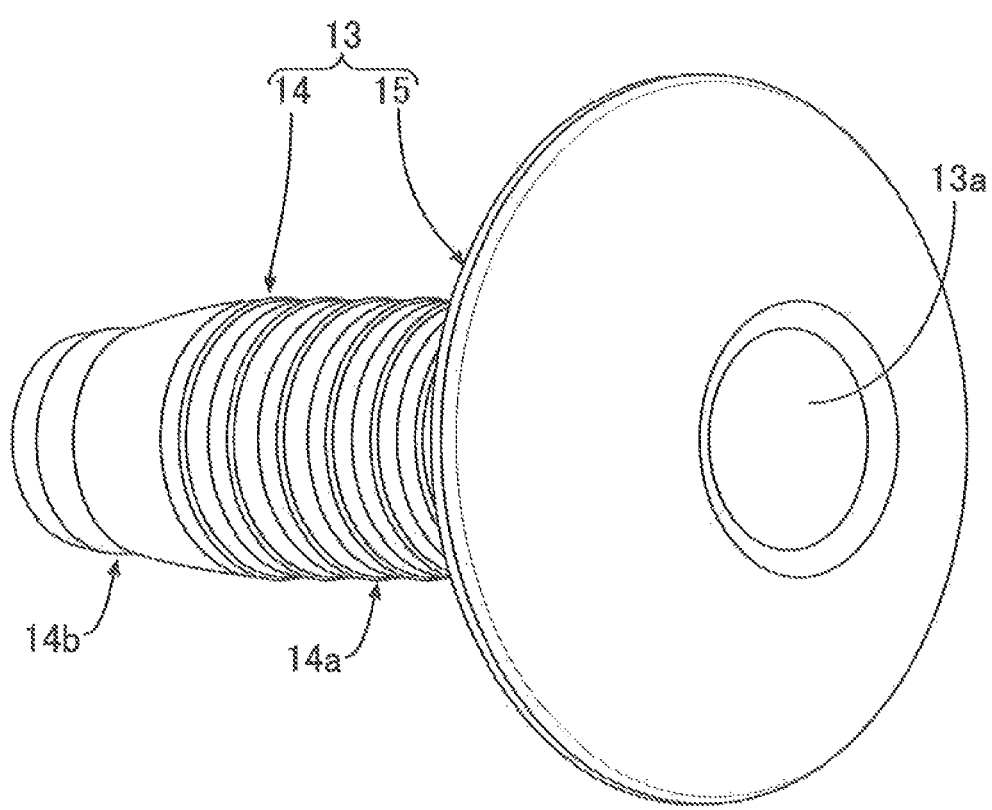
FIG. 2 is a perspective view of the waterproof clip (first embodiment).
Figure 3:
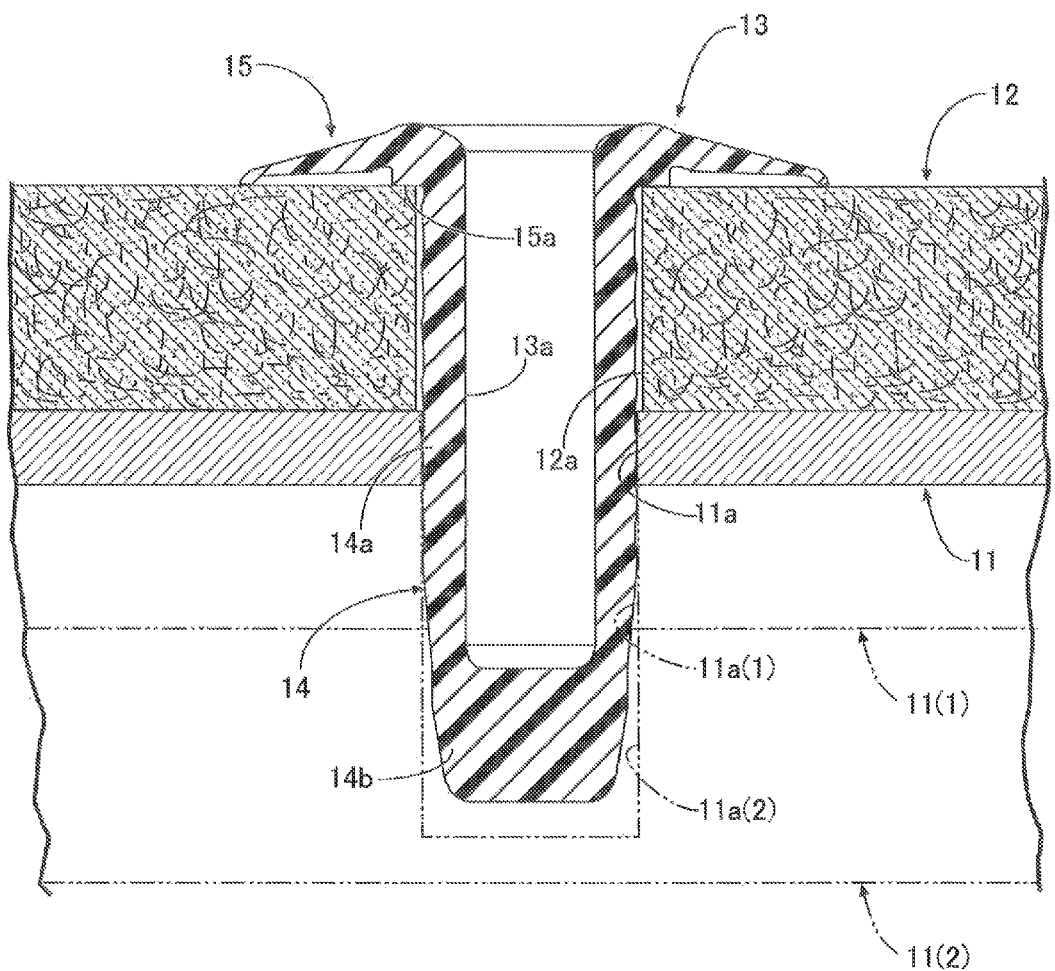
FIG. 3 is a longitudinal cross-sectional view of the waterproof clip in a used state (first embodiment).

As shown in FIGS. 1 to 3, a waterproof clip 13 for fixing a sheet-shaped interior material 12 to a metal panel member 11 of an automobile is integrally molded from a flexible synthetic resin such as TPV (Thermo Plastic Vulcanizates) and the like, for example. The waterproof clip 13 includes a shaft portion 14 formed in a substantially-cylindrical shape and a plate portion 15 bulging from a rear end of the shaft portion 14 in an insertion direction thereof toward an outer side in a radial direction in a plate shape or a umbrella shape.

The shaft portion 14 of the waterproof clip 13 includes: a main body portion 14a which is located on the rear end side in the insertion direction and which has a constant diameter; and a tapered portion 14b which is located on a front end side in the insertion direction and whose diameter becomes slightly smaller from the main body portion 14a. A number of annular uniform-diameter portions 14c and a number of annular bulging portions 14d are formed on an outer peripheral surface of the main body portion 14a, alternately at fixed intervals in an axial direction. A diameter of each of the uniform-diameter portions 14c is constant in the axial direction. Meanwhile, each of the bulging portions 14d has a wedge-shaped section and is tapered to become gradually narrower toward the front side in the insertion direction of the shaft portion 14. A hollow portion 13a extending from the plate portion 15 to an inner portion of the shaft portion 14 is formed in an inner portion of the waterproof clip 13. A front end of the hollow portion 13a in the insertion direction is located near a rear end of the tapered portion 14b, and the tapered portion 14b is thus substantially solid.

Thickness of the plate portion 15 of the waterproof clip 13 becomes smaller from a portion connected to the shaft portion 14 toward the outer side in the radial direction. Moreover, the plate portion 15 is inclined forward in the insertion direction of the shaft portion 14 toward the outer side in the radial direction to have the umbrella shape. An annular protruding portion 15a is provided to protrude from the portion where the plate portion 15 is connected to the shaft portion 14. The protruding portion 15a improves stiffness of the plate portion 15.

A through-hole 12a into which the shaft portion 14 of the waterproof clip 13 is inserted is formed in the interior material 12. A diameter of the through-hole 12a is slightly larger than that of the shaft portion 14 of the waterproof clip 13. Moreover, a fixation hole 11a into which the shaft portion 14 of the waterproof clip 13 is press-fitted is formed in the panel member 11. A diameter of the fixation hole 11a is slightly smaller than that of the shaft portion 14 of the waterproof clip 13.

Next, operations of the waterproof clip 13 of the present invention having the aforementioned configuration are described.

Multiple through-holes 12a are formed at predetermined intervals in a peripheral edge portion of the interior material 12, and multiple fixation holes 11a are formed in the panel member 11 to correspond to the through-holes 12a of the interior material 12. When the interior material 12 is positioned relative to the panel member 11, the fixation holes 11a of the panel member 11 and the through-holes 12a of the interior material 12 overlap one another. Accordingly, the shaft portion 14 of the waterproof clip 13 inserted into each of the through-holes 12a of the interior material 12 can be press-fitted to the corresponding fixation hole 11a of the panel member 11. At this time, since the tapered portion 14b is formed at the front end of the shaft portion 14 in the insertion direction thereof, the shaft portion 14 can be easily inserted into the fixation hole 11a of the panel member 11 by using the tapered portion 14b as a guide.

When the main body portion 14a of the shaft portion 14 is press-fitted into the fixation hole 11a of the panel member 11 subsequent to the tapered portion 14b, the bulging portions 14d of the main body portion 14a, each of which has a larger diameter than the fixation hole 11a, are compressed inward in the radial direction, and strong friction force acts between the bulging portions 14d and an inner peripheral surface of the fixation hole 11a. The shaft portion 14 is thereby fixed in such a way as not to come out. Moreover, a space between the shaft portion 14 and the fixation hole 11a is sealed in a liquid tight manner, and water can be prevented from entering the interior material 12 side through the fixation hole 11a. At this time, since the bulging portions 14d are tapered to become narrower toward the front side in the insertion direction of the shaft portion 14, it is possible to easily press fit the shaft portion 14 into the fixation hole 11a while improving a waterproof function by sufficiently compressing the bulging portions 14d. Furthermore, since the hollow portion 13a is formed in the inner portion of the shaft portion 14, the shaft portion 14 easily elastically deforms and fitting of the waterproof clip 13 is facilitated. In addition, the shaft portion 14 is in tight contact with the inner peripheral surface of the fixation hole 11a, and waterproofness and air tightness is improved.

When the clip shaft portion 14 is completely inserted, the plate portion 15 comes into contact with a surface of the interior material 12, and the interior material 12 is interposed between the panel member 11 and the plate portion 15 of the waterproof clip 13. The interior material 12 is thus fixed to the panel member 11. Fixing the peripheral edge portion of the interior material 12 with multiple waterproof clips 13 arranged at predetermined intervals prevents the peripheral edge portion of the interior material 12 from turning up.

Moreover, since the plate portion 15 includes the annular protruding portion 15a in the connection portion with the shaft portion 14, the plate portion 15 is less likely to be bent rearward in the insertion direction of the shaft portion 14 and is surely in tight contact with the surface of the interior material 12. Furthermore, since the shaft portion 14 has a number of the bulging portions 14d arranged at equal intervals in the axial direction, it is possible not only to surely bring any of the bulging portions 14d into contact with the inner peripheral surface of the fixation hole 11a of the panel member 11 so as to improve fixation strength of the waterproof clip 13, but also to fix the interior material 12 without any trouble even when thickness of the panel member 11 changes to various thicknesses as in panel members 11(1) and 11(2) of FIG. 3.

As described above, the waterproof clip 13 of the embodiment can prevent water from entering the interior material 12 side through the fixation hole 11a of the panel member 11 without need of a special seal member. Accordingly, the number of parts and the number of assembly steps can be reduced. Moreover, the bulging portions 14d of the waterproof clip 13 have better durability than conventional claw-shaped anchors and conventional blade-shaped anchors which are fragile, and holding force does not decrease even when attachment and detachment is performed repeatedly. Furthermore, since the bulging portions 14d are fixed to the inner peripheral surface of the fixation hole 11a of the panel member 11, the interior material 12 can be fixed without a decrease of the holding force even when the thickness of the panel member 11 is too large for the shaft portion 14 to penetrate the fixation hole 11a, as in the panel member 11(2) of FIG. 3.

Second Embodiment

Figure 4:
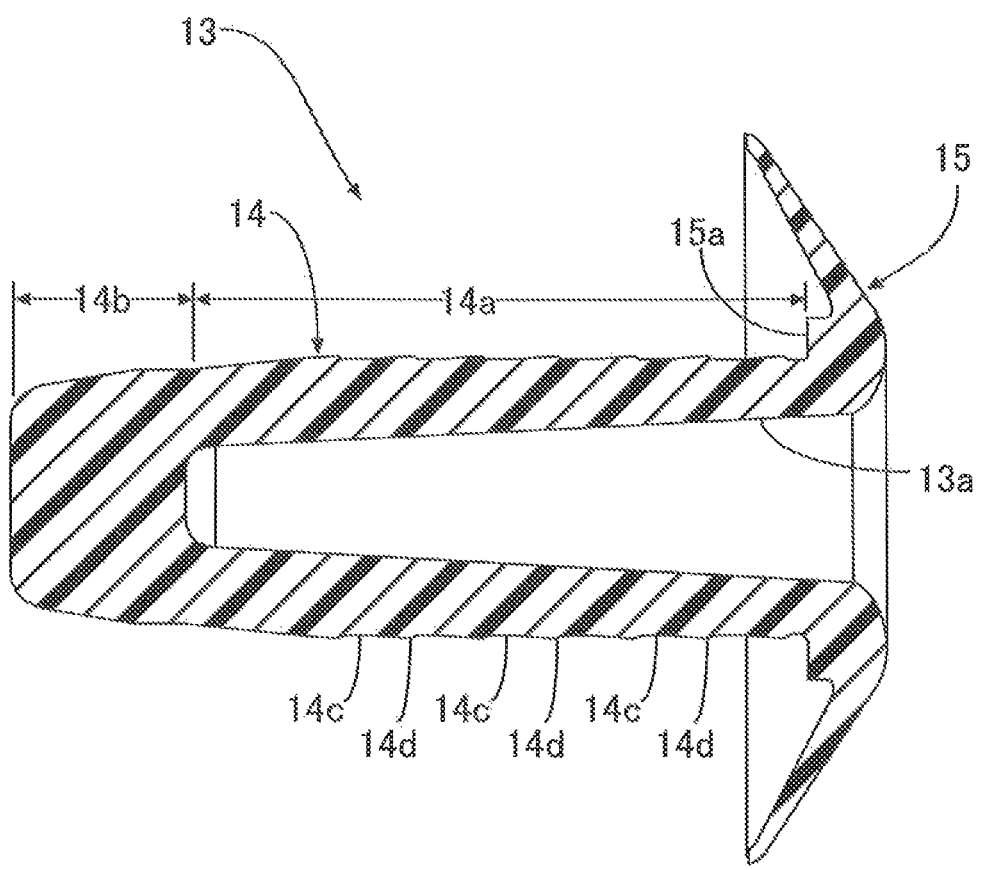
FIG. 4 is a longitudinal cross-sectional view of a waterproof clip (second embodiment).

Next, a second embodiment of the present invention is described based on FIG. 4.

Although the hollow portion 13a of a waterproof clip 13 of the first embodiment has a constant diameter along an entire length of the hollow portion 13a, a hollow portion 13a of a waterproof clip 13 of the second embodiment has a sectional area which becomes smaller toward a front side in an insertion direction. Due to this, thickness of a tapered portion 14b of a shaft portion 14 is increased, and the tapered portion 14b is less likely to be bent. Hence, insertion into a fixation hole 11a of a panel member 11 is facilitated.

Although the embodiments of the present invention have been described above, various design changes can be made within a scope not departing from the gist of the present invention.

For example, there is no need for the fixation hole 11a to penetrate the panel member 11, and the fixation hole 11a may be a hole with a closed end like a fixation hole 11a(2) of the panel member 11(2) in FIG. 3.

Moreover, the material of the waterproof clip 13 is not limited to that in the embodiments, and a vulcanizing agent can be used in the molding of the waterproof clip 13.

What is claimed is:

1. A waterproof clip made of an elastic material, configured for fixing an interior material to a panel member, the waterproof clip comprising:
    a shaft portion that is configured to penetrate a through-hole of the interior material and is configured to be press-fitted to a fixation hole of the panel member; and
    a plate portion provided at a rear end of the shaft portion in an insertion direction thereof and configured to come into contact with a surface of the interior material, wherein
    the shaft portion comprises a main body portion which is located on a rear end side in the insertion direction, and a tapered portion which is located on a front end side in the insertion direction and whose diameter becomes smaller from the main body portion, and the tapered portion is substantially solid,
    a number of bulging portions which are configured to elastically come into contact with an inner peripheral surface of the fixation hole are formed on an outer peripheral surface of the main body portion,
    each of the bulging portions is formed to become narrower toward a front side in the insertion direction of the shaft portion and
    a hollow portion is formed in an inner portion of the main body portion, the hollow portion being open to the plate portion and extending to a position near a rear end of the tapered portion in the insertion direction.

2. The waterproof clip according to claim 1, wherein the hollow portion has a sectional area which becomes smaller toward the front side in the insertion direction of the shaft portion.

3. The waterproof clip according to claim 1, wherein the plate portion includes an annular protruding portion in a connection portion.

4. The waterproof clip according to claim 1, wherein the bulging portions are formed at equal intervals in an axial direction.

* * * * *